UNITED STATES PATENT OFFICE.

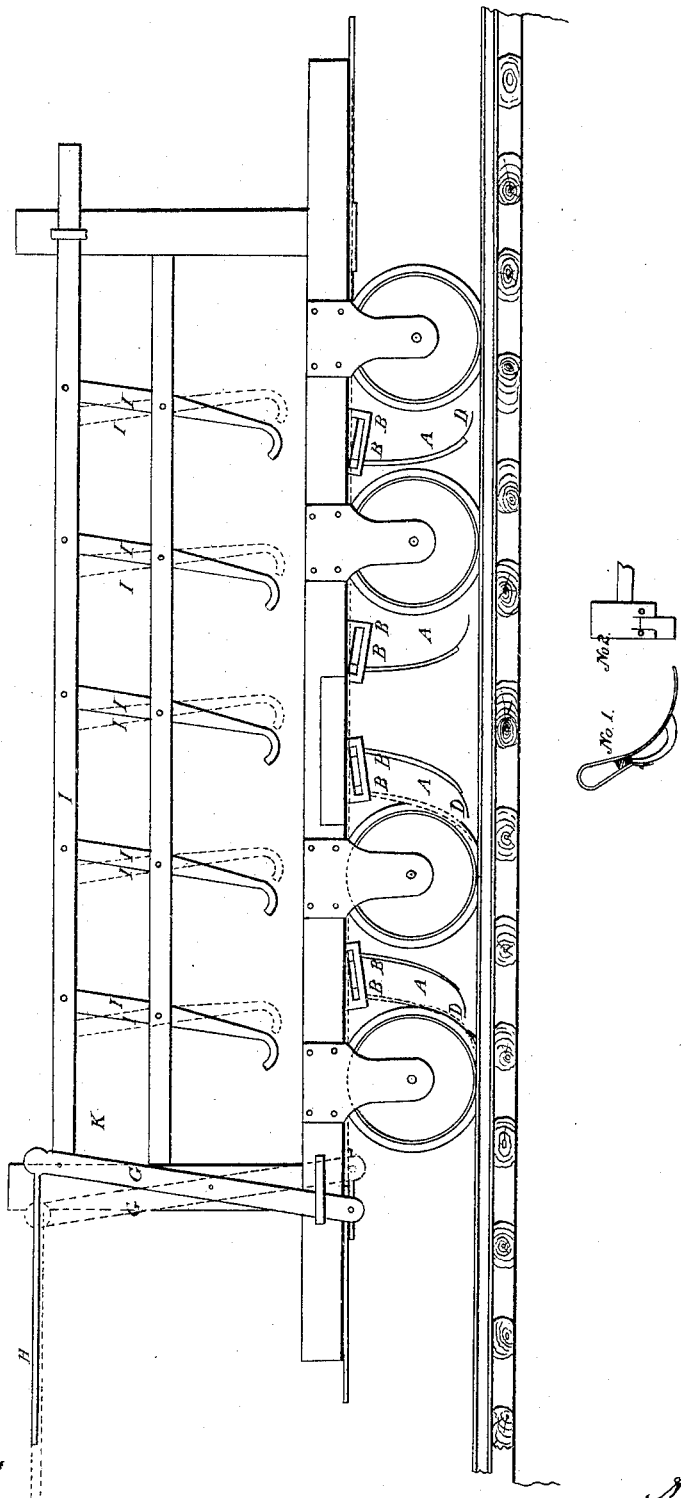

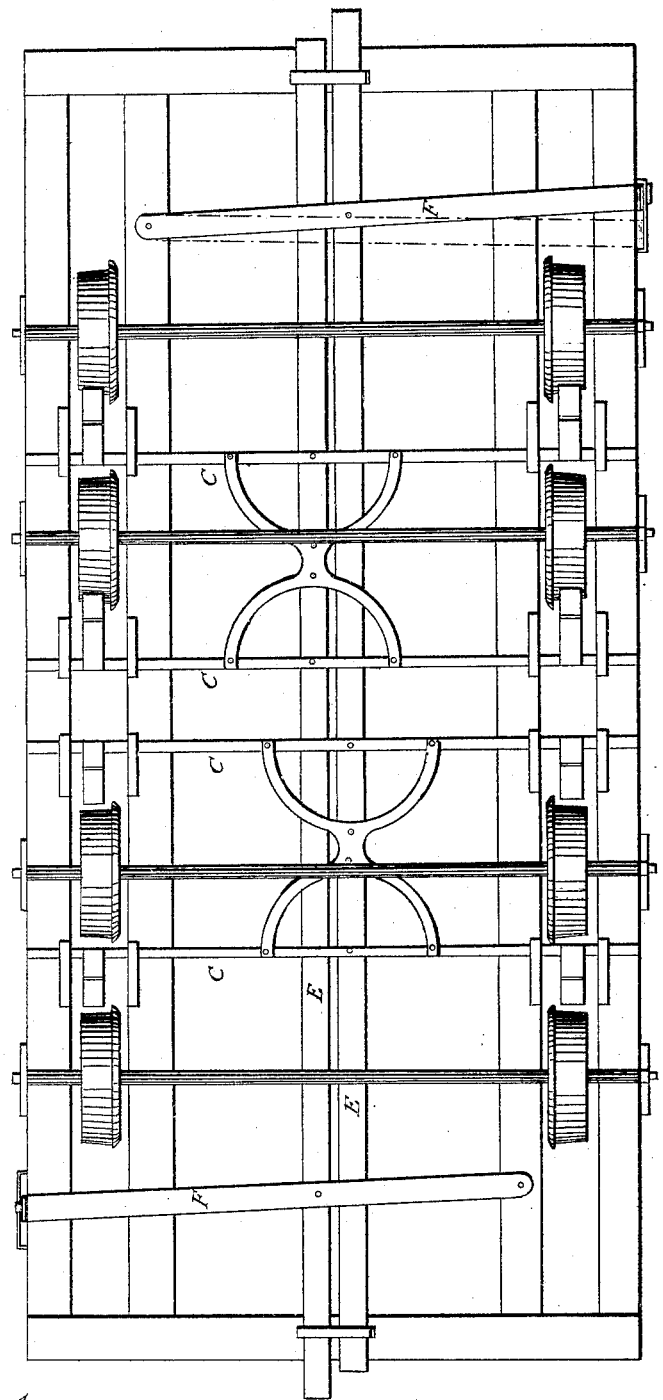

ABRAM DEHUFF, OF YORK, PENNSYLVANIA.

PREVENTING COLLISIONS ON RAILROADS.

Specification of Letters Patent No. 23,232, dated March 15, 1859.

*To all whom it may concern:*

Be it known that I, ABRAM DEHUFF, of the borough of York, county of York, and State of Pennsylvania, have invented a new and improved mode of stopping railroad-cars in case of collision or other dangerous obstruction that might befall said cars.

The nature of my invention consists as follows viz:
First is a spring carrier or boot A, made of strong iron hung on the sills beneath the car or frame of the truck in front of the wheel supported by two strong inclined staples B, B, and a rod or bar of iron, C, to pass through said spring carrier, A, to meet the same on the opposite side so that both ends pass through said spring carrier, A, and said inclined staples, B, B, are made long so that the boot, A, can slide the required distance to pass under the wheels at the end of said spring carrier or boot.

A, is a plate of steel, D, which when made to operate will hug or embrace the wheel and the spring carrier or boot, A, will slide upon the rails. The bar of iron, C, connects with another bar of iron, E, running lengthwise beneath the car. The bar of iron, E, is made to slide back and forward as required and to it is attached a lever F which extends to the side of the car the end of which connects with the rod, G, to reach the eaves of the roof of the car and from rod, G is another rod, H, which extends forward to the locomotive with a hand hold for the use of the engineer and also running back from rod, G, is another rod I to connect all the levers J, J, to each passenger's seat, and for the use of the conductor or brakeman when on the platform or inside of the car back of the door is a hand hold, K, inside and out. The object of this invention is to stop the locomotive and cars more expeditiously than any other heretofore known and may be stopped by any passenger in front of his seat not dependent alone on those having charge of the train. I have designed another boot expressly for the locomotive which takes hold of the rail more powerfully in case of immediate danger highly necessary marked No. 1 and 2 in drawing, can be applied instantly and by the power of one hand.

I am aware that the shoe or boot running under the wheel is not new, it has been made by others and I do not claim it. But, What I claim as my invention and desire to secure by Letters Patent is—

The spring carrier, A, hung on two inclined staples B B, beneath the car or truck to hug or embrace the wheels cross bar, C long bar E, lever F, rod, G, lever H, rod I, levers, J, J, and lever K when arranged for joint operation with each other substantially as and for the purpose herein described.

ABRAM DEHUFF.

Witnesses:
ISREAL KLING,
GEORGE LAUCKS.